United States Patent [19]

Kingdon et al.

[11] Patent Number: 5,784,560
[45] Date of Patent: *Jul. 21, 1998

[54] METHOD AND APPARATUS TO SECURE DISTRIBUTED DIGITAL DIRECTORY OBJECT CHANGES

[75] Inventors: Kevin Kingdon, Freemont, Calif.; Randal Earl Childers, Orem, Utah; DeeAnne Higley, Provo, Utah; Dale R. Olds, Sandy, Utah

[73] Assignee: Novell, Inc., Provo, Utah

[ * ] Notice: The term of this patent shall not extend beyond the expiration date of Pat. No. 5,677,857.

[21] Appl. No.: 573,034

[22] Filed: Dec. 15, 1995

Related U.S. Application Data

[63] Continuation-in-part of Ser. No. 357,467, Dec. 15, 1994, Pat. No. 5,677,851.

[51] Int. Cl.$^6$ .................................................. H04L 12/28
[52] U.S. Cl. .................... 395/200.31; 395/200.31; 395/200.59; 395/200.47; 395/200.55
[58] Field of Search ................... 395/187.01, 200.31, 395/200.33, 200.42, 200.47, 200.48, 200.53, 200.59, 200.49, 200.56, 200.68, 200.55; 370/908

[56] References Cited

U.S. PATENT DOCUMENTS

| | | |
|---|---|---|
| 5,001,628 | 3/1991 | Johnson et al. |
| 5,136,716 | 8/1992 | Harvey et al. |
| 5,220,604 | 6/1993 | Gasser et al. ............... 380/23 |
| 5,367,635 | 11/1994 | Bauer et al. |
| 5,367,698 | 11/1994 | Webber et al. |
| 5,388,257 | 2/1995 | Bauer . |
| 5,483,652 | 1/1996 | Sudama et al. |
| 5,491,817 | 2/1996 | Gopal et al. |
| 5,495,607 | 2/1996 | Pisello et al. |
| 5,499,343 | 3/1996 | Pettus . |
| 5,499,358 | 3/1996 | Nevarez . |

OTHER PUBLICATIONS

2334D IEICE Transactions on Information and Systems, .A Two–Key–Lock Pair Control Method Using Prime Factorization and Time Stamp. Min–Shiang Hwang et al. E77–D(1994) Sep., No. 9, Tokyo, Japan.

2460 IEEE Communications Magazine, .Access Control: Principles and Practice., Ravi S. Sandhu and Pierangela Samarati, 32 (1994) Sep., No. 9, New York, U.S.

Proceedings of the International Carnahan Conference on Security Technology,. .A Dynamic Access Control Model for Object–Oriented System.. Peter Shaohua Deng, Chenyuan Kauo, Victor T. S. Kao, Oct. 13–15, 1993, Taipei.

Wolfgang Prinz, "Representing Authorization Information in the X.500 Directory", 1992, pp. 301–317, Elsevier Science Publishers B.V. (North–Holland).

Herbert Bunz et al., "Exchange of Patient Records—Prototype Implementation of a Security Attributes Service in X.500", 1994, pp. 30–38, ACM, Fairfax, Virginia.

Primary Examiner—Emanuel T. Voeltz
Assistant Examiner—Patrick Assovad
Attorney, Agent, or Firm—Dinsmore & Shohl LLP

[57] ABSTRACT

A method and apparatus for providing access control to objects in a distributed network directory employing static resolution to resolve object attributes. A first object has a Security Equals attribute and a second object has an Equivalent To Me attribute. Upon receiving a request for the first object to access the second object, authorization of such access is verified by checking if the two attributes are synchronized. The attributes are synchronized when the Security Equals attribute of the first object includes the second object, and the Equivalent To Me attribute of the second object includes the first object. A method of synchronizing the two attributes is also disclosed.

26 Claims, 4 Drawing Sheets

METHOD AND APPARATUS TO SECURE DISTRIBUTED DIGITAL DIRECTORY OBJECT CHANGES

RELATED APPLICATIONS

This is a continuation-in-part of application Ser. No. 08/357 467 filed Dec. 15, 1994, now U.S. Pat. No. 5,677, 851.

BACKGROUND

The present invention relates generally to resolving attributes of objects, and will be specifically disclosed in connection with a system for resolving such object attributes in a distributed digital network directory.

Technological advances in microelectronics, digital computers, and software have resulted in the proliferation of computer networks. In such networks, computers telecommunicate between each other and share information, applications and services. One type of computer network employs a client-server architecture, wherein the portions of network applications that interact with human users are typically separated from the portions of network applications that process requests and information, often, the portions of an application that interact with the user are called client applications or client software, and the portions of the application that process requests and information are called server applications or server software. In a client-server network environment, client applications and server applications are generally executed on different computers, known as clients and servers, respectively, although servers can be clients as well.

An early form of digital networks were local area networks, commonly referred to as LANs, which consist of a physical collection of computers generally interconnected with network cabling and network interface cards. Historically, LANs comprised a single network server and multiple network clients. The network server manages the network resources, such as files, printers, printer queues, server applications, etc. As part of this management, the network server maintained information on each of the network resources, the identities of the network clients and users, and the scope and the nature of the access available to the network clients and users.

As LANs became more popular, these networks grew in size requiring several servers to manage the needs of clients and users, which made the management of the network increasingly difficult. Logistically, this was difficult because users required access to an increasing number of network resources that were located on an increasing number of network servers. Adding to the difficulty was the multiple server structure itself: macro management of the network servers within a LAN was essential, however, each network server maintained a discrete directory that stored its own unique information and networking services, which required independent micro management. Further adding to the difficulty was the lack of a standard scheme of providing networking services information. As a result, a variety of vendors began offering their own particular networking servers each having a unique and idiosyncratic schemes.

The associated difficulties with this insular method of maintaining information of networking services fueled research and development of distributed network directories. With distributed directories, a single directory spans and is shared by multiple networking servers. Thus far, research has resulted in several distributed directory protocols, some of which hold great promise for replacing the large number of insular and idiosyncratic directories that now litter many of the existing LANs and electronic-mail systems. One of the more popular solutions exploits the X.500 network services protocol developed and published by the CCITT (now called ITU-T) and Open Systems Interconnect Consortium. Part of the X.500 protocol specification describes a distributed directory wherein information can be created, read, modified, and shared by network clients who have applicable access rights across a plurality of servers. The structure of the information stored in the distributed directory is enforced by the directory schema. While the X.500 protocol appears to hold great promise to provide a robust distributed directory, the X.500 protocol has been slow to gain acceptance. The X.500 protocol specification describes a technical framework, interoperability requirements and compliance criteria, however, it does not describe specific implementations. Therefore, many of the details of implementation have been deferred to systems providers, which has resulted in variability and ultimately the lack of a true standard.

A distributed directory contains a collection of objects with associated attributes or properties tied together by their relationship to each other. For example, FIG. 1 shows an object named "Computer" with some of its associated properties, such as "Owner", "Operator", "Status", etc. The values of the associated attributes are not shown in FIG. 1, but an example of a value for the property "Owner" might be "George". Often, objects in a distributed directory and their names (e.g. "Computer" in FIG. 1) represent things that humans relate to when dealing with computers. For instance, some typical objects might represent users, printers, print queues, network files, resources, etc. In addition, objects could represent non-computer related things, such as countries, companies, organizations, departments, buildings, etc. As one with ordinary skill in the art will readily appreciate, an object can represent virtually anything, whether imaginary or real.

Often, the objects contained within a distributed directory can be viewed by a user in a hierarchial structure, generally in the form of a tree, where objects are organized in subtrees and partitions. FIG. 2 shows such a hierarchial structure. Each of the branches and terminating points represent objects in the distributed directory, and each of the circles represent partitions. Each partition contains a set of objects wherein the root-most object is referred to as the partition root. Multiple replicas of a partition can be stored in the distributed directory, wherein each insular server could hold a unique set of partitions and at the same time hold a unique hierarchy of objects within that insular machine. A server that maintains a partition is referred to as a name server, which is responsible for updating and making modifications to objects within the partition. Through the distributed directory framework, changes made by the name server to the partition will be distributed to the various replicas. Directory schemas define and determine the types of replicas of each partition, such as master partitions, read only partitions, duplicate partitions, etc. This hierarchial structure of objects and partitions is an effective way to reduce network storage, control network traffic, and ultimately speed access to the distribute directory.

The hierarchial structure or tree provides a logical means of searching for information within the distributed directory. The tree is generally patterned after logical groupings such as organizations, organizational units, computers, users, etc. For example, in FIG. 2 Partition A could represent the legal department of a company and Partition C could represent the tax group, a subordinate group to the legal department. Each partition forms a major subtree of the distributed directory. Taken together, the partitions form a hierarchial structure of partitions that lead back to the Root Partition. Where boundaries of two partitions meet, the partition closer to the Root Partition is considered superior, and the partition further from the Root Partition is considered subordinate. Thus, in FIG. 2 Partition E is subordinate to Partition B and subordinate to the Root Partition, and Partition B is superior to Partition E and subordinate to the Root Partition.

These logical groupings, while extremely useful in helping users find relevant information, can create logistical challenges in managing the distributed directory. As objects in the distributed directory change, the distributed directory must be changed as well. For example, organizations, organizational units, computers and users all move. Today, the legal department may be reporting through the finance department. Tomorrow, one of the employees of the finance department might be moved to marketing. The day after, another employee could receive a promotion granting him or her new rights and privileges. Therefore, objects and partitions in the distributed directory must be capable of being changed.

A distributed directory can become accessible to non-trusted parties, and such parties could make unauthorized changes within the distributed directory. This is particularly true as a distributed directory proliferates and more name servers are added to the network. For example, two companies may participate in the same distributed network. While complete trust may not exist between the two companies, each company could have a name server that maintains a partition within the distributed directory and have replicas of other partitions. As is readily apparent to one with ordinary skill in the art, such access could take a variety of forms and is not limited by the previous example. Because non-trusted parties could access information contained in the distributed directory, these non-trusted parties may tamper with or change important information in the distributed directory. If such tampering is allowed, the success of a distributed directory could be severely impacted.

Tampering may occur in objects that employ a static means of resolving object attributes, also referred to as static resolution. Another means of resolving object attributes is referred to as dynamic resolution. Resolving object attributes refers to comparing an attribute value or a set of values within one or more objects with another value or set of values to determine if they match. Generally, static resolution is employed to decrease network traffic in larger networks, whereas dynamic resolution is generally used in smaller networks. For example, FIG. 3 compares these two means to resolve object attributes. The people and things Boyd 31, Group A 32, and Printer C 33 are all represented by objects 31a,b, 32a,b, and 33a,b. As represented by the Dynamic resolution table 34, upon receiving request from Boyd 31 to print to Printer C 33, a dynamic system searches through random access memory ("RAM") for the object Printer C 33a in Column 36a. Next, the dynamic system 34 searches through the associated attributes 37a of the object Printer C 33a. When the dynamic system 34 finds the object Group A 32a, it then searches through the associated attributes 37a of the object Group A 32a until it finds the object Boyd 31a. Having resolved the object attributes and checked that the values match, the system has verified that the object Boyd 31a has authorization to access the object Printer C 33a, and the dynamic system 34 then accepts the request from the Boyd 31 to print to the Printer C 33. On the other hand, a static system 35 searches the associated attribute 37b the object Boyd 31b for the object Printer C 33b. If the object Printer C 33b is an attribute of the object Boyd 31b, the static system 35 then accepts the request from Boyd 31 to print to Printer C 33. While a dynamic system 34 tends to be faster in smaller computer systems, a static system 35 tends to be faster in larger computer systems.

While providing superior performance in larger computer systems, static resolution can introduce a potential security problem, particularly in a distributed directory having multiple replicas of partitions. For instance, if the object Boyd 31b is maintained by a name server that is physically located in Company A, and the object Printer C 33b is maintained by a separate name server that is physically located in Company B, someone could, without Company B's consent, tamper with the attributes 37b of the object Boyd 31b and add Printer C 33b as an attribute. As a result, Boyd 31 could access Printer C33 even though Company B did not authorize such access. This is true because a static system 35 looks at the attributes 37b associated with the object 36b requesting access, which object 36b is beyond the control of Company B. Thus, there is a need for a means for resolving object attributes without the attendant problems with the prior art.

SUMMARY OF THE INVENTION

Accordingly, an object of this invention is to increase security in computers.

An additional object of this invention is to provide an improved method for resolving attributes of objects.

Another object of this invention is to provide an improved method for synchronizing attributes associated with objects.

Yet another object of this invention is to provide an improved method for securing object changes.

A further object of this invention is to provide an improved method for enhancing static object resolution.

Still a further object of this present invention is to achieve the foregoing objects in a distributed directory.

Additional objects, advantages, and novel features of the invention will be set forth in part in the description that follows and in part will become apparent to those skilled in the art upon examining or practicing the invention. The objects and advantages of the invention may be realized and obtained by means of the instrumentalities and combinations particularly pointed out in the appended claims.

To achieve the foregoing and other objects of this invention, a method is provided for verifying that a first object has authorization to access a second object. The first object has a Security Equals associated attribute, which attribute contains a list of other objects from which the first object derives or inherits rights. The second object has an Equivalent To Me associated attribute, which attribute contains an authoritative list of all objects that have security equal to the second object. Authorization is verified if the Security Equals attribute in the first object and the Equivalent To Me attribute in the second object are synchronized. The two associated attributes are synchronized when the Security Equals attribute of the first object includes the second object, and the Equivalent To Me attribute of the second object includes the first object. If the two attributes are not synchronized, a further aspect of the invention provides for the system to notify a person or a computer that unauthorized access to the second object was attempted.

The present invention also provides a process for synchronizing the Security Equals and the Equivalent To Me attributes. The process of synchronization can be initiated upon receiving a request to modify the Equivalent To Me attribute of the second object. For example, such a request could suggest that the first object be added to the Equivalent To Me list of the second object. Next, the process verifies that the Equivalent To Me attribute may be modified. Verification can be achieved in a variety of ways, including checking that the requestor has proper system authorization or checking through business administrative procedures that the first object has authorization to access the second object. Once verified, the first object can be added to the Equivalent To Me attribute of the second object. Then, the Security Equals attribute of the first object can be synchronized to the modified Equivalent To Me attribute by adding the second object to the Security Equals attribute.

Still other aspects of the present invention will become apparent to those skilled in the art from the following description of a preferred embodiment, which is simply by way of illustration is one of the best modes contemplated for carrying out the invention. As will be realized, the invention is capable of other different obvious aspects all without departing from the invention. Accordingly, the drawings and descriptions are illustrative in nature and not restrictive.

BRIEF DESCRIPTION OF THE DRAWINGS

The accompanying drawings, incorporated in and forming part of the specification, illustrate several aspects of the present invention and together with their description serve to explain the principles of the invention. In the drawings.

Reference will now be made in detail to the present preferred embodiment of the invention, an example of which is illustrated in the accompanying drawings, wherein like numerals indicate the same elements throughout the views.

DETAILED DESCRIPTION OF THE PREFERRED EMBODIMENT

The software of the preferred embodiment of the invention supports a security mechanism for deterring the tampering of objects contained in a distributed directory. The distributed directory of the preferred embodiment has a schema that includes a collection of class definitions and attribute definitions. Each object in this schema belongs to a class, which class has a textual name within a class hierarchy. Descending the class hierarchy corresponds to increasing specialization. For example, a server is a specialization of a device, and a print server is a specialization of a server. The objects also has a name hierarchy, which can be analogized to a tree structure. Objects at interior nodes, or objects closer to the root of the tree, are "container" objects that are considered superior to relatively exterior nodes, or objects closer to the leaves of the tree, which are considered subordinate. In addition to belonging to a class these objects have attributes whose values can be read and written. Each attribute has a textual name and a syntax by which its values are represented, wherein the name can be from one to 32 characters in length (excluding null termination). A given attribute can have a range of valid values and a variety of other attribute characteristics, such as whether an attribute is mandatory or optional.

Objects can reference other objects. Such references are organized or controlled by specialized access attributes associated with such objects. In the preferred embodiment, when a first object references a second object, the first object contains an access attribute named "Security Equals" and the second object contains an access attribute named "Equivalent To Me." Both access attributes are statically resolved and may have multiple values. The Security Equals attribute, which as used in the present specification and claims shall mean any attribute that contains a list of other objects from which the first object derives or inherits rights, or to which the object has access rights. For instance, a user object named Boyd, having the objects George and Group A in its Security Equals attribute list, inherits the rights that George and Group A have for other objects. As a further example, a user object named Heidi could have the object Tape Drive in its Security Equals attribute list whereby Heidi would have access rights to the Tape Drive. The Equivalent To Me attribute, which as used in the present specification and claims shall mean any attribute that contains a list of all objects that have security equal to the object associated with that attribute. In the present embodiment, the Equivalent To Me attribute is used as the authoritative attribute for access control of a given object. So, in the foregoing examples, the objects George and Group A would have Boyd in their Equivalent To Me attribute lists, and the object Type Drive would have Heidi in its Equivalent To Me attribute list.

Figure 1:
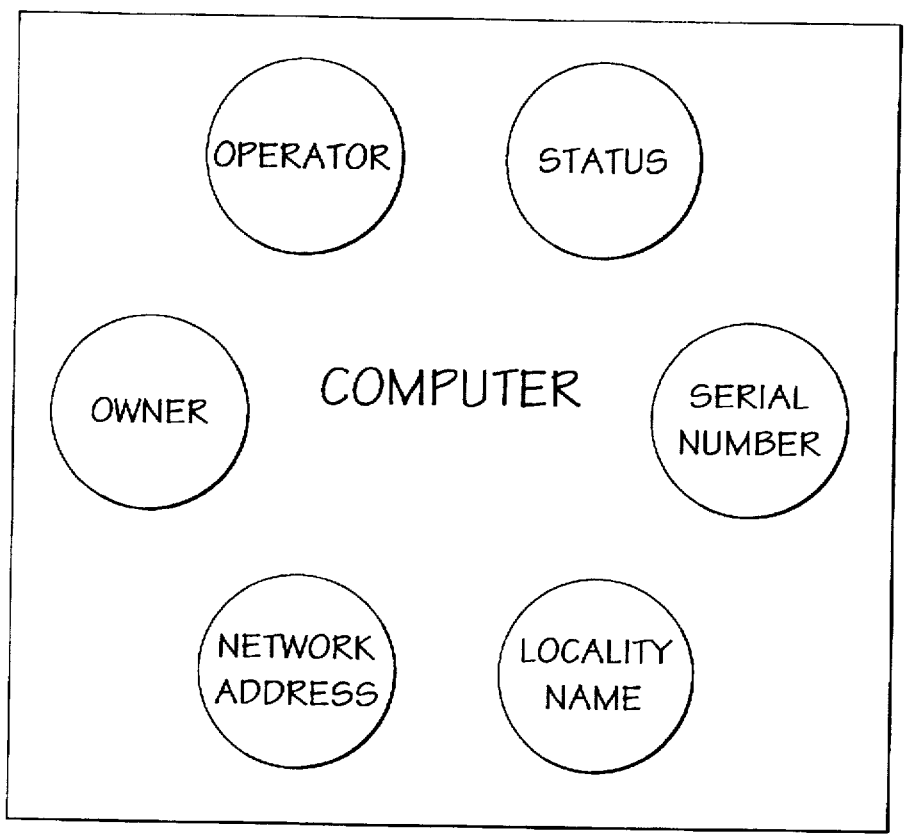
FIG. 1 shows a typical object with some of its associated attributes.
Figure 2:
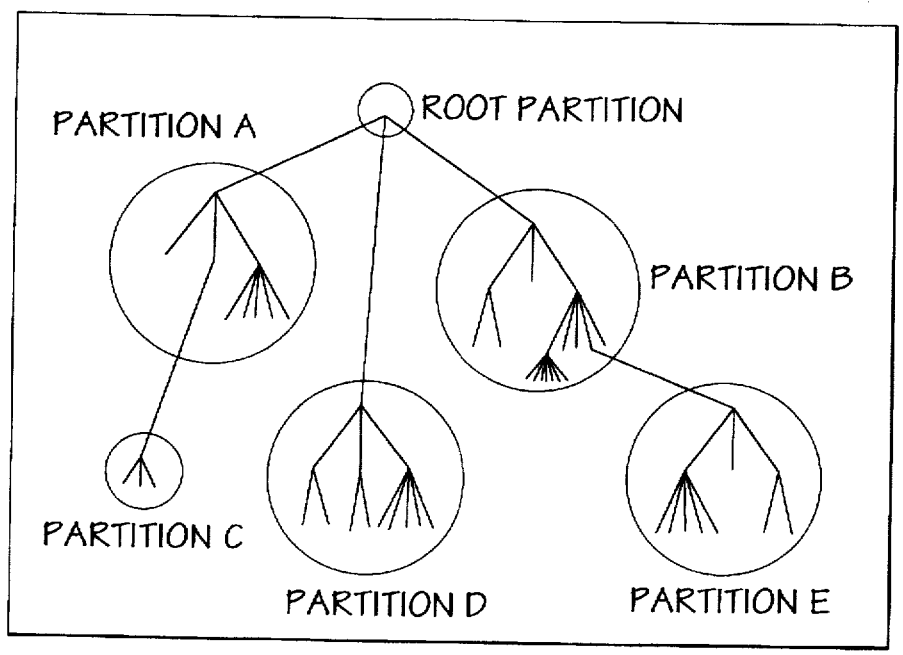
FIG. 2 shows a typical distributed directory.
Figure 3:
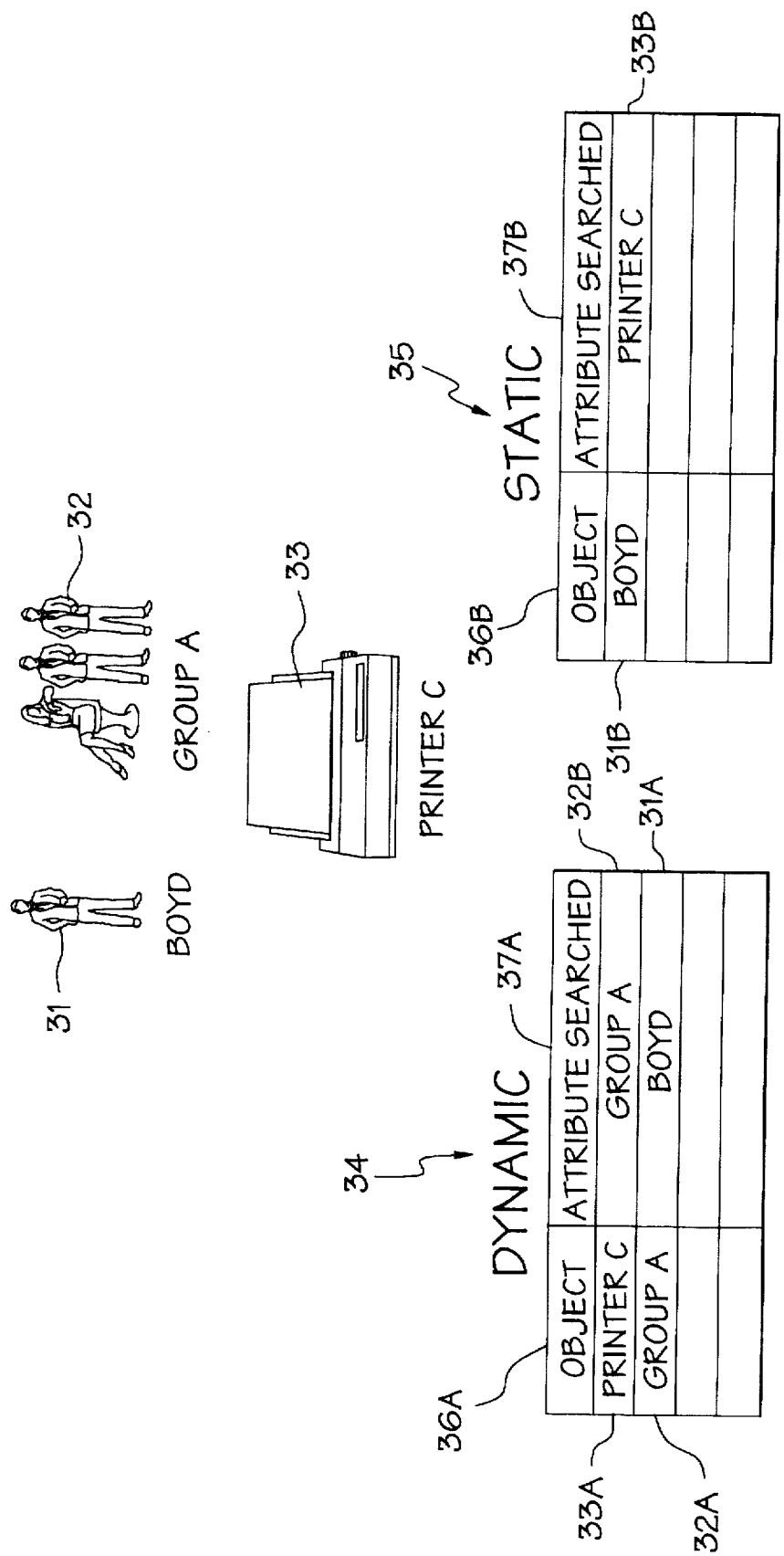
FIG. 3 illustrates the difference between dynamic and static resolution.
Figure 4:
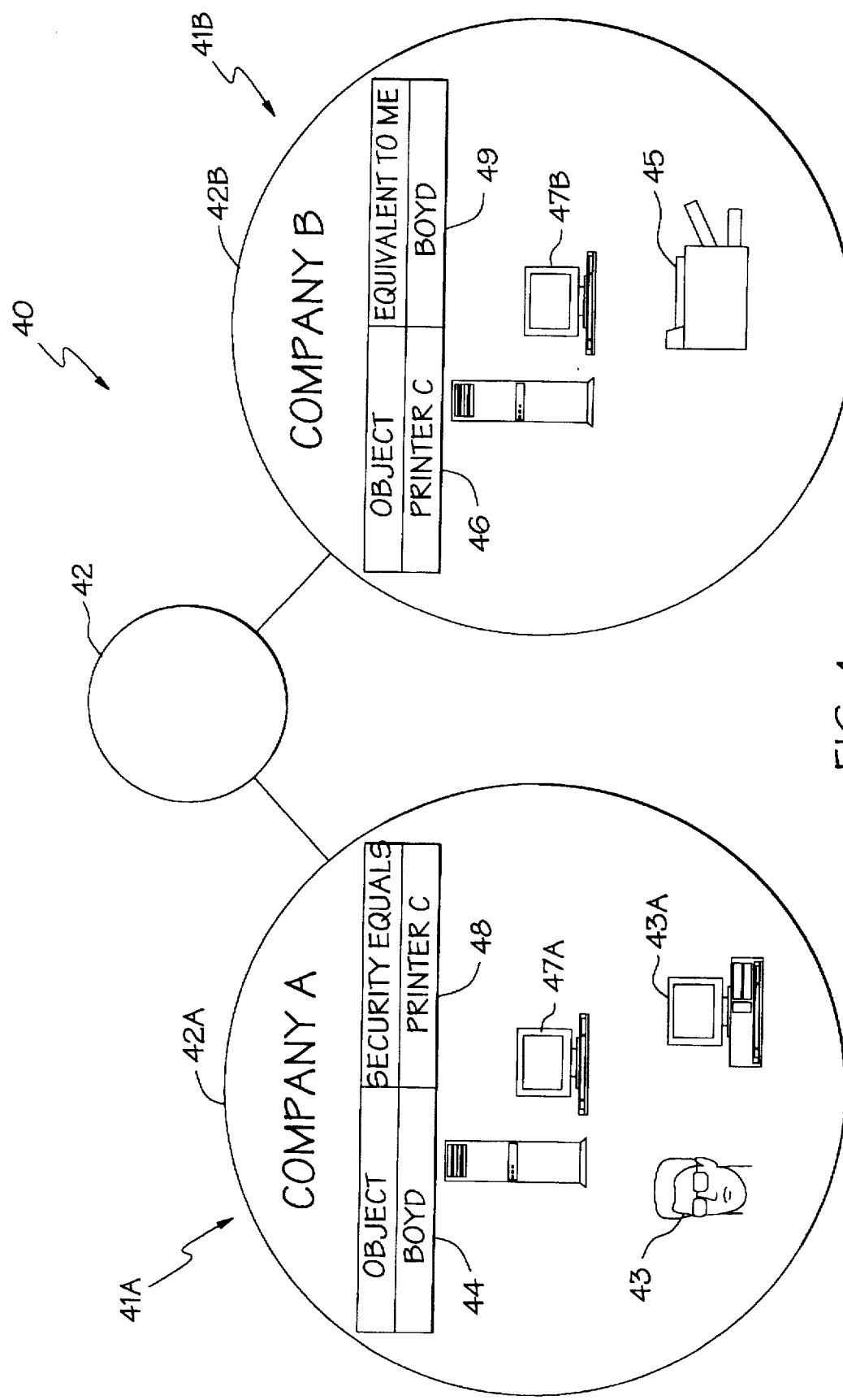
FIG. 4 illustrates the use of the Security Equals and Equivalent To Me attributes in a distributed directory employing static resolution of object attributes where the attributes are synchronized.

FIG. 4 illustrates how the Security Equals and Equivalent To Me attributes are used in the preferred embodiment. In this example, Company A 41a and Company B 41b work with one another in separate offices, however complete trust does not exist between the two companies. The two companies 41a, 41b both share and participate in a distributed network 40, wherein each company operates a name server 47a, 47b that maintains a partition 42a, 42b for the respective companies 41a, 41b. Each of these partitions 42a, 42b are subordinate to the root partition 42. An employee of Company A 41a named Boyd 43 operates a client computer 43a that communicates with the name server 47a as part of their working relationship. Boyd 43 has been authorized to print to and otherwise access Printer C 45 located in the offices of Company B 41b. The partition 42a includes an object Boyd 44 representing employee Boyd 43, which object 44 has a Security Equals attribute 48. Similarly, the partition 42b includes an object Printer C 46 that has an Equivalent To Me attribute 49, which object 46 represents the physical Printer C 45. The name server 47a controls and maintains the object Boyd 44, and the name server 47b controls and maintains the object Printer C 46.

As one skilled in the art will readily appreciate, the two servers 47a, 47b can telecommunicate between each other either directly or indirectly in any of a variety of ways, such as modem, physical connections, internetworking, gateway links, satellite links, etc. Although the present example demonstrates an embodiment of this invention in the context of a distributed directory 40, the teachings of this disclosure could be readily applied by one with ordinary skill in the art in multiple other arrangements, such as between two machines having discrete non-distributed directories or within a single machine that maintains both the objects in question 44, 46.

In the present example, when Boyd 43 uses an application running on the client computer 43a to request access to Printer C 45, such as the form of a print job, the client 43a passes the request to the server 47a in the form of a request such as "Resolve Name." Resolve Name is an operation whereby a client may start determining the values of the various attributes. This operation takes an object's Distinguished Name and returns "Entry IDs" or addresses of the object that can be used to access a corresponding value. Through the request parameters, the client computer 43a indicates the various characteristics of the desired Entry ID. In the present example, Resolve Name can additionally identify the Distinguished Name of Printer C 45, namely CN=Printer C.OU=Domain B.O=Company B which represents where the object Printer C 46 is located within the distributed directory hierarchy. In this example, "CN" is the common name, "O" is the organizational name, and "OU" is the organizational unit.

Next, the preferred embodiment looks into the list of values in the Security Equal attribute 48 of object Boyd 44 using a function such as "Read". Read is a function used to determine the value of an attribute, which function returns the values of a given attribute for a specified object. When used in the context of the present example, the server 47a uses Read to resolve the Security Equals attribute 48 and return the value "Printer C". After resolving the Security Equals attribute 48, the server 47a issues a Read request to the server 47b located in Company B 41b. Similar to the Read request for the object Boyd 44, the server 47b references the object Printer C 46 and returns the access control list associated with the Equivalent To Me attribute 49. In the present example, a value in the Equivalent To Me attribute 49 is "Boyd." Next, synchronization between the attributes 48, 49 is checked. Synchronization is determined by comparing the values for Security Equals attribute 48 and the Equivalent To Me attribute 49, and determining if the respective attributes 48, 49 reference the opposite objects 44, 46. The example illustrated in FIG. 4 shows synchronization between the attributes of the two objects: "Printer C" is the value of the Security Equals attribute 48 and "Boyd" is the value of the Equivalent To Me attribute 49. Having established that there is synchronization, the servers 47a, 47b acknowledge that employee Boyd 43 has authorization to access the physical Printer C 45, and the print job is then processed.

Figure 5:
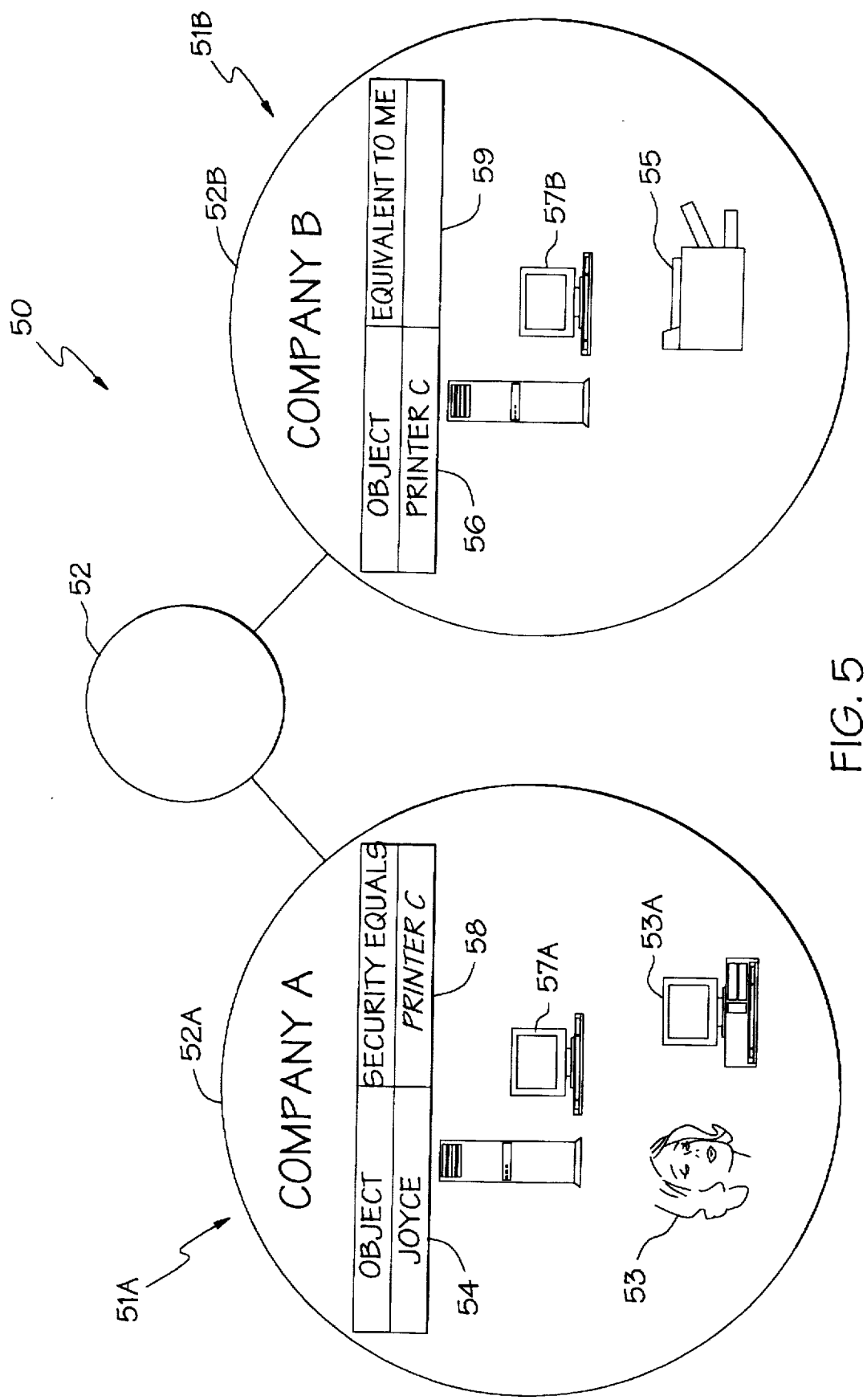
FIG. 5 illustrates the use of the Security Equals and Equivalent to Me attributes in a distributed directory employing static resolution of object attributes where the attributes are not synchronized.

While FIG. 4 demonstrates what happens when the values of Security Equals and Equivalent To Me attributes 48, 49 are synchronized, FIG. 5 demonstrates when the attributes are not synchronized. Like the prior example, Company A 51a and Company B 51b work together, however complete trust does not exist between two companies. In this example, an employee named Joyce 53 of Company A 51a will attempt to gain unauthorized access to Printer C 55 located in Company B 51b. The companies 51a, 51b participate in a distributed directory 50, wherein each company has a name server 57a, 57b that maintains a partition 52a, 52b, respectively. Server 57a maintains the object Joyce 54, and server 57b maintains the object Printer C 56. The two companies 51a, 51b in their working relationship have agreed that Joyce 53 should not have access to Printer C 55, thus the value "Printer C" has not been added as a value to the Security Equals attribute 58 of the object Joyce 53, and "Joyce" has not been added as a value to the Equivalent To Me attribute 59 of the object Printer C 56.

Disregarding this agreement, employee Joyce 53 will attempt to access Printer C 55 by modifying the values associated with the object Joyce 54. In the present example, such modification takes the form of adding the value "Printer C" to the Security Equals attribute 58 (shown in italics to indicate an illicit modification). In this example, Joyce 53 had the ability to modify the object Joyce 54 because she had physical access to the server 57a. However, access can take a variety of other forms.

Having modified the Security Equals attribute 58 of the object Joyce 54, the employee Joyce 53 makes a request to access Printer C 55, such as sending a print job through the client computer 53a. The client computer 53a forwards a request such as Resolve Name to server 57a. Using a function such as Read, the server 57a resolves the values of the Security Equals attribute 58 for the object Joyce 54. Because the employee Joyce 53 added the value "Printer C" to the Security Equals attribute 58, the server 57a will not detect an anomaly and will issue a request to server 57b located in Company B 51b using a function such as Read. Next, the server 57b accesses the Equivalent To Me values 59 for the object Printer C 56. Because the value "Joyce" is not a value in the Equivalent To Me attribute, there is no synchronization, and access to Printer C55 will be denied. The server 57a will notify Joyce 53 through a message that she does not have rights to Printer C 55. In addition, either one of the servers 57a, 57b could notify the system administrator (not shown), a separate name server (not shown), or Printer C 55 that employee Joyce 53 attempted an unauthorized access to Printer C 55.

While the examples illustrated in FIGS. 4 and 5 concern access to a printer, one with ordinary skill in the art will readily appreciate that the present invention can be applied to virtually anything represented by objects, such as computers, print servers, fax servers, storage devices, databases, etc. In addition, the present invention is not limited to things represented by objects located in different physical locations or separate computers. For example, the present invention could be applied in a wing of an advertising firm having one server that maintains objects representing an expensive color printer and the employees, wherein only certain graphic designers are allowed access to the printer. The present invention could also be applied to non-physical objects, such as subdirectories, partitions, files, databases, applications, etc. For instance, a company could implement the present invention to limit access to a subdirectory containing sensitive company information relating to a corporate merger. The system administrator of the company LAN, which could have only one server, could establish a subdirectory object named "Merger" having an Equivalent To Me attribute with a list of values of user objects representing the privy employees: Jay, Heidi, and Rob. For each of these user objects, the system administrator could add the value "Merger" to their Security Equals attribute. In doing so, only the users Jay, Heidi, and Rob could access the subdirectory Merger. The present invention could also be applied within a program or on a system level. For example, in an insular stand-alone machine, one object variable could attempt access to a second object variable as part of a program organization, wherein the request is initiated automatically without a human prompt. These examples are intended to illustrate that the present invention can be applied wherever object attributes are resolved.

The specifically described embodiment includes a mechanism for securely synchronizing the Security Equals and Equivalent To Me attributes. Using the example illustrated in FIG. 4, Boyd 43 could be granted access to Printer C 45 by synchronizing the Security Equals and Equivalent To Me attributes 48, 49 of the respective objects 44, 46. The process of synchronization can be initiated in a variety of ways. For example, synchronization can be initiated when a network client application, possibly operated by the system administrator, passes a request to server 47b to add the value "Boyd" to the Equivalent To Me attribute 49 of the object Printer C 46. Such a request could take the form of a request such as "Modify Object." Modify Object is a function used for modifying attribute values for a specified object, wherein the act of modifying can include adding, deleting or changing the values of a given attribute. The distributed directory schema of the preferred embodiment allows most attributes to have multiple values, so there may be several kinds of individual changes to the same attribute in a Modify Object request, each modification adding, deleting or changing an attribute value.

After receiving the Modify Object request, the server 47b verifies the existence of the object Boyd 44 by making the request Resolve Name. In the present example, where the object Boyd 44 is maintained by the server 47a, this request must be sent to server 47a, which responds whether or not the object Boyd 44 exists. If the object Boyd 44 exists, the server 47b verifies that employee Boyd 43 has access rights to Printer C 45. This verification can be accomplished in any number of different ways. For example, the server 47b can read a database of the various objects and the corresponding access rights, possibly located in the root partition 42. As a further example, the server 47b could prompt the system administrator or some other user having the appropriate corporate authority to confirm that employee Boyd 43 has access rights. Having verified that employee Boyd 43 has access rights to Printer C 45, the server 47b modifies the Equivalent To Me attribute 49 of the object Printer C 46 by adding the value "Boyd" in the Equivalent To Me attribute 49.

Next, the server 47b issues a "Check Sev" request to server 47a. Check Sev is a request to check the security equivalence of an object. After receiving the Check Sev request, the server 47a notes that server 47b suggests that a change has been made to the Equivalent To Me attribute 49 of the object Printer C 46 and that the object Boyd 44 was involved in the change. Then, server 47a issues a request to the server 47b in the form of Resolve Name for the object Printer C 46, and server 47b returns the corresponding Entry ID. Next, server 47a issues a request in the form of "Read Entry Info" to determine the partition root (not shown) of partition 42b containing the object Printer C 46. Read Entry Info is different from Read. While Read obtains values of an object's attributes, Read Entry Info obtains other values associated with the object. For instance, using Read Entry Info a client can read an entry's modification time stamp, the Entry ID of its containing parent, or any other of a variety of values associated with the object.

The server 47a then issues a request in the form of Read to determine the attribute values of Printer C's object 46. Next, server 47a issues a request to server 47b in the form of "Compare" to verify the presence or absence of the value "Boyd" in the Equivalent To Me attribute 49 of the object Printer C 46. The Compare operation reports whether a client-supplied value is one of the entry values for an attribute identified in the request. A common use of the Compare operation is to determine if a user object is a member of a specific group. Lastly, the server 47a modifies the Security Equals attribute 48 of the object Boyd 44 based on the presence or absence of Equivalent To Me attribute 49. If the value is present, the server 47a adds the value "Printer C" in the Security Equals attribute 48. On the other hand, if the value is not present the server 47a does not add the value "Printer C" to Security Equals attribute 48.

The foregoing description of the preferred embodiment of the invention has been presented for purposes of illustration and description. It is not intended to be exhaustive nor to limit the invention to the precise form disclosed. Many alternatives, modifications and variations will be apparent to those skilled in the art in light of the above teaching. Accordingly, this invention is intended to embrace all such alternatives, modifications and variations that fall within the spirit and broad scope of the appended claims.

We claim:

1. A method of resolving object attributes in a computer system, wherein a first object and a second object each have at least one associated attribute and each object is part of a distributed directory having a schema, comprising the steps of:
   a) determining an associated attribute of the first object;
   b) checking that the second object is included in the associated attribute of the first object;
   c) determining an associated attribute of the second object; and
   d) checking that the first object is included in the associated attribute of the second object.

2. A method as recited in claim 1, further comprising the step of notifying that the attributes of the first and second objects are not synchronized if at least one of the following events occurs:
   a) the second object is not included in the associated attribute of the first object; or
   b) the first object is not included in the associated attribute of the second object.

3. A method as recited in claim 1, further comprising the step of allowing the first object to access the second object if:
   a) the second object is included in the associated attribute of the first object; and
   b) the first object is included in the associated attribute of the second object.

4. A method as recited in claim 1, wherein the first and second objects employ static resolution.

5. A method as recited in claim 1, wherein the associated attribute of the first object is a Security Equals attribute, and the associated attribute of the second object is an Equivalent To Me attribute.

6. A method as recited in claim 1, wherein the first and second objects are contained within different partitions in a distributed directory.

7. A method as recited in claim 6, wherein the different partitions are maintained by different servers.

8. A method of synchronizing an associated attribute of a first object and an associated attribute of a second object in a computer system, wherein each object is part of a distributed directory having a schema, comprising the steps of:
   a) receiving a request to modify the associated attribute of the second object;
   b) verifying that the associated attribute of the second object may be modified;
   c) modifying the associated attribute of the second object; and
   d) synchronizing the associated attribute of the first object and the associated attribute of the second object by modifying the associated attribute of the first object to correspond to the modified associated attribute of the second object.

9. A method as recited in claim 8, further comprising after Step (c) and before Step (d) the step of verifying that the associated attribute of the second object has been modified.

10. A method as recited in claim 8, wherein the act of modifying an associated attribute includes one or more of the following steps:

a) adding a value to such an attribute;

b) deleting a value to such an attribute; or c) changing a value to such an attribute.

11. A method as recited in claim 8, wherein the step of modifying the associated attribute of the first object to correspond to the modified associated attribute of the second object is achieved by adding the second object to the attribute of the first object if the first attribute was added to the attribute of the second object.

12. A method as recited in claim 8, wherein the step of modifying the associated attribute of the first object to correspond to the modified associated attribute of the second object is achieved by deleting the second object from the attribute of the first object if the first object was deleted from the attribute of the second object.

13. A method as recited in claim 8, wherein the first and second objects are contained within different partitions in a distributed directory.

14. A method as recited in claim 13, wherein the different partitions are maintained by different servers.

15. A method of verifying that a first object has authorization to access a second object in a computer system, wherein the first object and the second object each have at least one associated attribute and each object is part of a distributed directory having a schema, comprising the steps of:

a) receiving a request for the first object to access the second object;

b) determining the associated attribute of the first object and the associated attribute of the second object;

c) checking that the second object is included in the associated attribute of the first object and that the first object is included in the associated attribute of the second object; and d) verifying that the first object has authorization to access the second object if:

i. the second object is included in the associated attribute of the first object; and ii. the first object is included in the associated attribute of the second object.

16. A method as recited in claim 15, further comprising the step of: notifying that an unauthorized access to the second object was attempted if one of the following events occurs:

a) the second object is not included in the associated attribute of the first object; or b) the first object is not included in the associated attribute of the second object.

17. A method as recited in claim 15, wherein the first and second objects employ a static resolution to resolve object attributes.

18. A method as recited in claim 15, wherein the associated attribute of the first object is a Security Equals attribute, and the associated attribute of the second object is an Equivalent to Me attribute.

19. A method as recited in claim 15, wherein the first and second objects are contained within different partitions in a distributed directory.

20. A method as recited in claim 19, wherein the different partitions are maintained by different servers.

21. A method as recited in claim 1, wherein the schema comprises a plurality of class definitions, each of the objects belonging to at least one class definition.

22. A method as recited in claim 21, wherein the schema comprises a plurality of attribute definitions, each of the objects having at least one attribute definition.

23. A method as recited in claim 22, wherein at least one attribute definition has a plurality of attribute values.

24. A computer system comprising a first computer and a second computer which are capable of transmitting and receiving information from one another, which first and second computers access a plurality of objects, wherein the first computer maintains a first object and the second computer maintains a second object, wherein the first and second objects are part of a distributed directory having a schema and wherein the first object has a first associated attribute which references at least the second object and the second object has a second associated attribute which references at least the first object.

25. A computer readable medium comprising a program for resolving object attributes having a first directory object and a second object, wherein each of said objects includes at least one associated attributed, wherein each object is part of a distributed directory having a schema, the program being capable of resolving object attributes by performing the steps of:

a) receiving a request for the first object to access the second object;

b) determining the associated attribute of the first object and the associated attribute of the second object;

c) checking that the second object is included in the associated attribute of the first object and that the first object is included in the associated attribute of the second object; and d) verifying that the first object has authorization to access the second object if:

i. the second object is included in the associated attribute of the first object; and ii. the first object is included in the associated attribute of the second object.

26. A computer system accessing a plurality of objects having associated attributes, wherein each of the objects is part of a distributed directory having a schema, the computer system comprising:

a) means for receiving a request for a first object to access a second object;

b) means for determining an associated attribute of the first object and an associated attribute of the second object;

c) means for checking that the second object is included in the associated attribute of the first object and that the first object is included in the associated attribute of the second object; and d) means for verifying that the first object has authorization to access the second object if:

i. the second object is included in the associated attribute of the first object; and ii. the first object is included in the associated attribute of the second object.

* * * * *

UNITED STATES PATENT AND TRADEMARK OFFICE
CERTIFICATE OF CORRECTION

PATENT NO. : 5,784,560
DATED : Jul. 21, 1998
INVENTOR(S) : Kingdon et al.

It is certified that error appears in the above-identified patent and that said Letters Patent is hereby corrected as shown below:

IN THE [*] SECTION

Please delete "5,677,857" and insert therefor --5,677,851--.

Signed and Sealed this

Twenty-ninth Day of December, 1998

Attest:

BRUCE LEHMAN

Attesting Officer

Commissioner of Patents and Trademarks